United States Patent
Chiu

(10) Patent No.: US 9,663,174 B2
(45) Date of Patent: May 30, 2017

(54) WATER BOTTLE CAGE FOR BI-DIRECTIONAL CLIPPING AT TWO OPPOSITE SIDES

(71) Applicant: IBERA CO., LTD., Changhua Hsien (TW)

(72) Inventor: Ansern Chiu, Changhua Hsien (TW)

(73) Assignee: Ibera Co., Ltd., Changhua Hsien (TW)

( * ) Notice: Subject to any disclaimer, the term of this patent is extended or adjusted under 35 U.S.C. 154(b) by 49 days.

(21) Appl. No.: 14/864,874

(22) Filed: Sep. 25, 2015

(65) Prior Publication Data

US 2017/0088209 A1  Mar. 30, 2017

(51) Int. Cl.
*B62J 11/00* (2006.01)
*F16B 2/18* (2006.01)
*F16B 2/10* (2006.01)
*F16B 2/12* (2006.01)

(52) U.S. Cl.
CPC ............... *B62J 11/00* (2013.01); *F16B 2/10* (2013.01); *F16B 2/18* (2013.01); *F16B 2/12* (2013.01)

(58) Field of Classification Search
CPC ...... F16B 2/12; F16B 2/10; F16B 2/18; A45F 3/16; Y10T 403/7009; Y10T 403/7011; Y10T 403/7013; B62J 11/00
USPC ....... 224/414, 552, 446, 456, 461, 501, 536, 224/323, 42.38, 570; 24/68 B
See application file for complete search history.

(56) References Cited

U.S. PATENT DOCUMENTS

| 1,059,143 | A  | * | 4/1913 | Wang ................. | D05C 1/04 24/68 B |
| 6,256,387 | B1 | * | 7/2001 | Wang ................. | H04M 1/04 379/446 |
| 8,651,349 | B2 | * | 2/2014 | Meissner et al. ....... | B60R 9/055 224/315 |
| 2013/0161365 | A1 | * | 6/2013 | Shih .................. | B62J 11/00 224/414 |

FOREIGN PATENT DOCUMENTS

DE            10308788 A1 *  9/2004  ............. B62J 11/00

* cited by examiner

*Primary Examiner* — Nathan J Newhouse
*Assistant Examiner* — Scott McNurlen
(74) *Attorney, Agent, or Firm* — Rosenberg, Klein & Lee

(57) ABSTRACT

A water bottle cage for bi-directional clipping at two opposite sides comprises a fixing base, two side clipping members, and a driving member. The fixing base has a supporting portion, a guiding portion, and at least one fixing portion. One side of each side clipping member includes a clipped guiding plate. One side of the clipped guiding plate corresponding to the guiding groove has at least one guiding convex portion. The clipped guiding plates are respectively located at two sides of the fixing base and slidably arranged at two ends of the clipped guiding groove. The spiral guiding groove of the driving member is assembled corresponding to the guiding convex portion. The spiral guiding groove drives the guiding convex portions of the clipped guiding plates so that the two side clipping members are respectively moved along the clipped guiding groove of the guiding portion in opposite directions.

5 Claims, 8 Drawing Sheets

WATER BOTTLE CAGE FOR BI-DIRECTIONAL CLIPPING AT TWO OPPOSITE SIDES

BACKGROUND OF THE INVENTION

1. Field of the Invention

The present invention relates to a water bottle cage, and especially relates to a water bottle cage for bi-directional clipping at two opposite sides. The clipped guiding grooves which are arranged at two side ends of the fixing base cooperate with the two side clipping members to clip the clipped guiding plates which are arranged at opposite sides respectively so as to clip two sides of the water bottle and push the water bottle to be against the fixing base with three-point clipping structure for slidably driving in opposite directions. It may firmly clip the water battle and make sure that the water bottle is hard to drop off 2. Description of Related Art Since riding bicycle may achieve the effects of environment friendly and exercise, the people of riding bicycle become more and more and further the equipment of the bicycle has been improved. One of the equipment is the water bottle cage. The water bottle cage which is arranged at the bicycle is convenient for the rider to take the water bottle easily. However, the size and shape of the bottle for receiving water or drinks are various and different. If the cage is design for clipping the bottle with specific size and shape, it cannot be modulate to clip the bottle with various sizes and shapes.

Please reference to Taiwanese patent no. M364039, which is issued on Sep. 1, 2009. It disclosed a bottle holder. The bottle holder comprises a base, a clipping member, and a fixing member. A supporting portion is arranged at a bottom end of the base. At least one sliding groove is arranged in the base. Two side wings are C shape and respectively arranged at two sides of the clipping member. The clipping member is inserted into the sliding groove and slidably moved in the sliding groove. The fixing member is used for fixing the clipping member in the sliding groove. The clipping member may be adjusted to a wanted position by a user. However, the clipping member which is assembled at the base is an elastic plate structure with an opening which has specific size. It is hard to modulate the clipping space but only for clipping the bottle with specific size. Once the size of the bottle is smaller than the clipping space, the bottle is not clipped firmly and easy to drop off Furthermore, there are only two clipping ends which are arranged at two sides of the opening of the clipping member to clip two sides of the bottle respectively to form two-point contact structure. The clipping stability of the two-point contact structure is relatively low and the bottle is easily dropped off from the clipping member.

Please also reference to Taiwanese patent no. M379545 (hereafter refer to '545), which is issued on May 1, 2010. It disclosed an adjustable kettle rack. The kettle rack comprises a base, a rotation base pivoted at the base, and a clipping frame fixed on the rotation base. The base has a bush which is providing the rotation base to pivot. An inclined guiding groove is formed at the peripheral of the bush corresponding to the rotation base. A free end of the inclined guiding groove is slidably inserted into the rotation base. The rotation base has an adjusting button. The adjusting button selectively drives a transmission member to shift. According to above mentioned structure, when the transmission member is driven by the adjusting button to shift, the transmission member may be guided by the inclined guiding block and the inclined guiding groove to make the rotation base drive the clipping frame to selectively be relatively close to or far away from the base. The object of adjusting the clipping size of the bottle is achieved. And the dropping off the bottle due to vibration while riding may be improved. However, the above mentioned operation may be shown with the dash line in FIG. 8 of '545. The clipping frame which is selectively relatively close to or far away from the base is only for changing unidirectional clipping angle. The clipping stability is relatively low. The bottle is easy to drop off from two sides between the clipping frame and the base. In addition, shown as the dash line in FIG. 8 of '545, The clipping frame which is selectively relatively close to or far away from the base is only for changing unidirectional clipping angle. It cannot clip or receive the bottle with larger size or special shape. Even the bottle with larger size or special shape is clipped, it is not firm and easy to drop off.

In view of the foregoing circumstances, the inventor has invested a lot of time to study the relevant knowledge, compare the pros and cons, research and develop related products. After quite many experiments and tests, the "water bottle cage for bi-directional clipping at two opposite sides" of this invention is eventually launched to improve the foregoing shortcomings, to meet the public use.

SUMMARY OF THE INVENTION

As a result, the present invention is to solve the disadvantages described as follows. The first disadvantage is that the conventional water bottle cage with unidirectional clipping is easy to drop off from two sides thereof. The second disadvantage is that the clip is angularly modulated in operation and it cannot effectively and firmly clip the water bottle with bigger size or specific shape to result in the limitation of adaption.

An object of this invention is providing a water bottle cage for bi-directional clipping at two opposite sides. The clipped guiding grooves which are arranged at two side ends of the fixing base cooperate with the two side clipping members to clip the clipped guiding plates which are arranged at opposite sides respectively so as to clip two sides of the water bottle and push the water bottle to be against the fixing base with three-point clipping structure for slidably driving in opposite directions. It may firmly clip the water battle and make sure that the water bottle is hard to drop off.

Another object of this invention is providing a water bottle cage for bi-directional clipping at two opposite sides. The distance of the two side clipping members between two sides of the fixing base is modulated to enlarge or shorten by moving in opposite directions. It is capable for firmly clipping the water bottle with various sizes and shapes and the adaption may be improved.

In order to achieve above mentioned objects and effects, a water bottle cage for bi-directional clipping at two opposite sides is provided. The water bottle cage may comprise a fixing base, one side thereof has a supporting portion and a guiding portion, the guiding portion further includes a clipped guiding groove, the supporting portion is located at a center of the clipped guiding groove and protruded from the guiding portion; two side clipping members, one side of each of the two side clipping members includes a clipped guiding plate, one side of the clipped guiding plate corresponding to the guiding groove has at least one guiding convex portion, an outer end of the at least one guiding convex portion is protruded from the guiding portion, the clipped guiding plates are respectively located at two sides of the fixing base and slidably arranged at two ends of the clipped guiding groove; and a driving member, having a limiting hole and a spiral guiding groove, the limiting hole is pivoted at the supporting portion of the fixing base, and the spiral guiding groove is assembled corresponding to the guiding convex portions of the clipped guiding plates; wherein the spiral guiding groove drives the guiding convex portions of the clipped guiding plates due to the rotation of the driving member so that the two side clipping members are respectively moved along the clipped guiding groove of the guiding portion in opposite directions to achieve that a clipping distance of the two side clipping members between two sides of the fixing base is modulated and a water bottle with various sizes and shapes is firmly clipped.

In some embodiments, the guiding portion further includes two guiding plates, the two guiding plates are respectively arranged at an upper side and a lower side of the supporting portion, one end of each guiding plate is connected to the fixing base and the other end of each guiding plate is extended outwardly and bent relatively to space apart from each other, and the clipped guiding groove is defined between the two guiding plates and the fixing base.

In some embodiments, the driving member includes a holding portion and a driving portion, the holding portion is a disc shape and a plurality of convex teeth is arranged at a peripheral of the holding portion, the driving portion is arranged at a side surface of the holding portion and the spiral guiding groove is arranged at the driving portion.

In some embodiments, the fixing base includes a limiting member for passing through the limiting hole of the driving member to lock at the supporting portion and for limiting the driving member.

In some embodiments, the limiting member has threads, a nut is embedded in one end of the supporting portion corresponding to the clipped guiding groove, a limiting step groove is concavely arranged at one end of the limiting hole of the driving member opposite to the driving portion, the limiting member is passing through the limiting hole of the driving member to screw with the nut, and a head end of the limiting member is against in the limiting step groove.

In some embodiments, two lower supporting plates are respectively arranged under the two side clipping members and extended in opposite directions.

In some embodiments, the fixing base includes two fixing portions for fixing at a bicycle, and the two fixing portions are respectively arranged at an upper side and a lower side of the guiding portion.

The various objectives and advantages of the present invention will be more readily understood from the following detailed description when read in conjunction with the appended drawing.

DETAILED DESCRIPTION OF THE INVENTION

Figure 1:
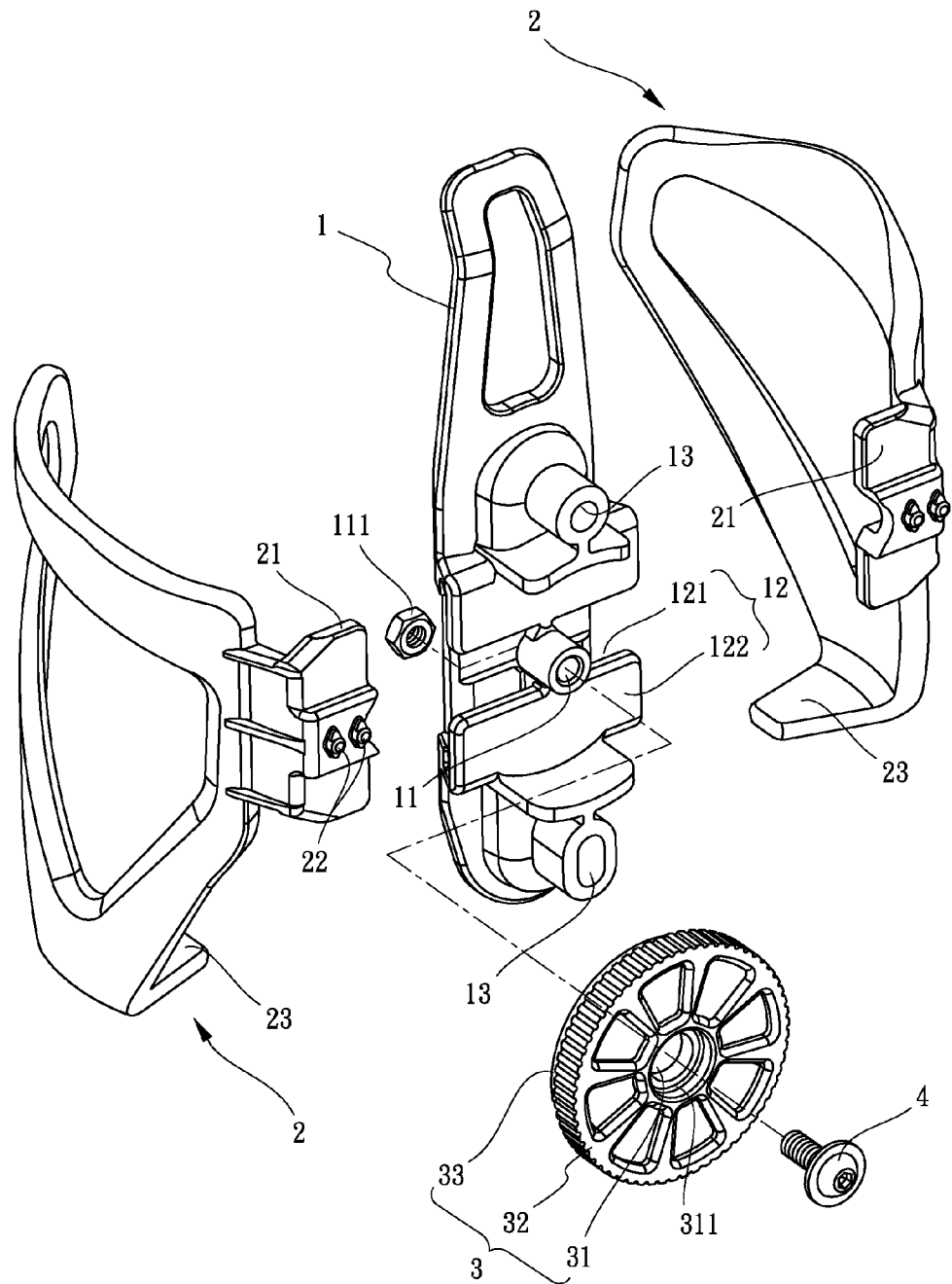
FIG. 1 is an exploded view of a water bottle cage for bi-directional clipping at two opposite sides of the present invention.
Figure 2:
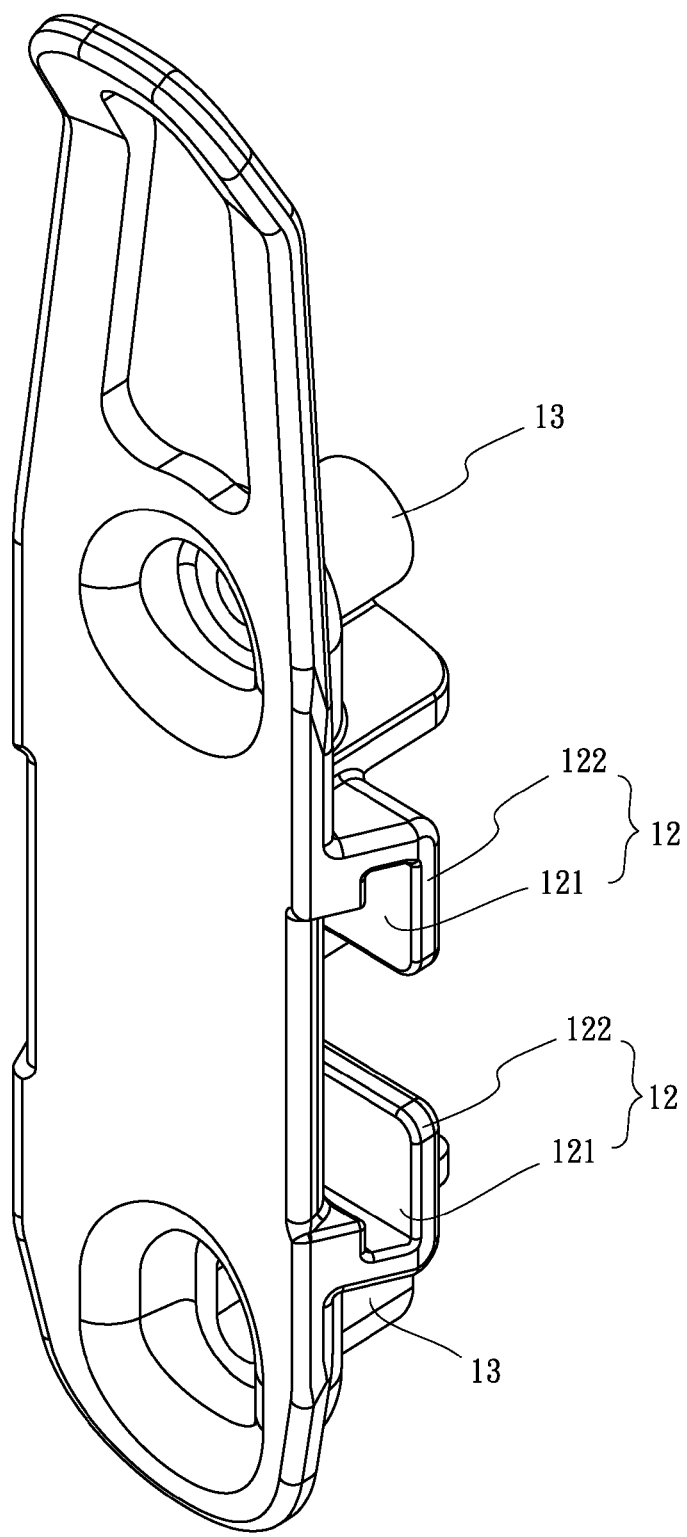
FIG. 2 is a perspective view of a fixing base of the water bottle cage of the present invention in another view.
Figure 3:
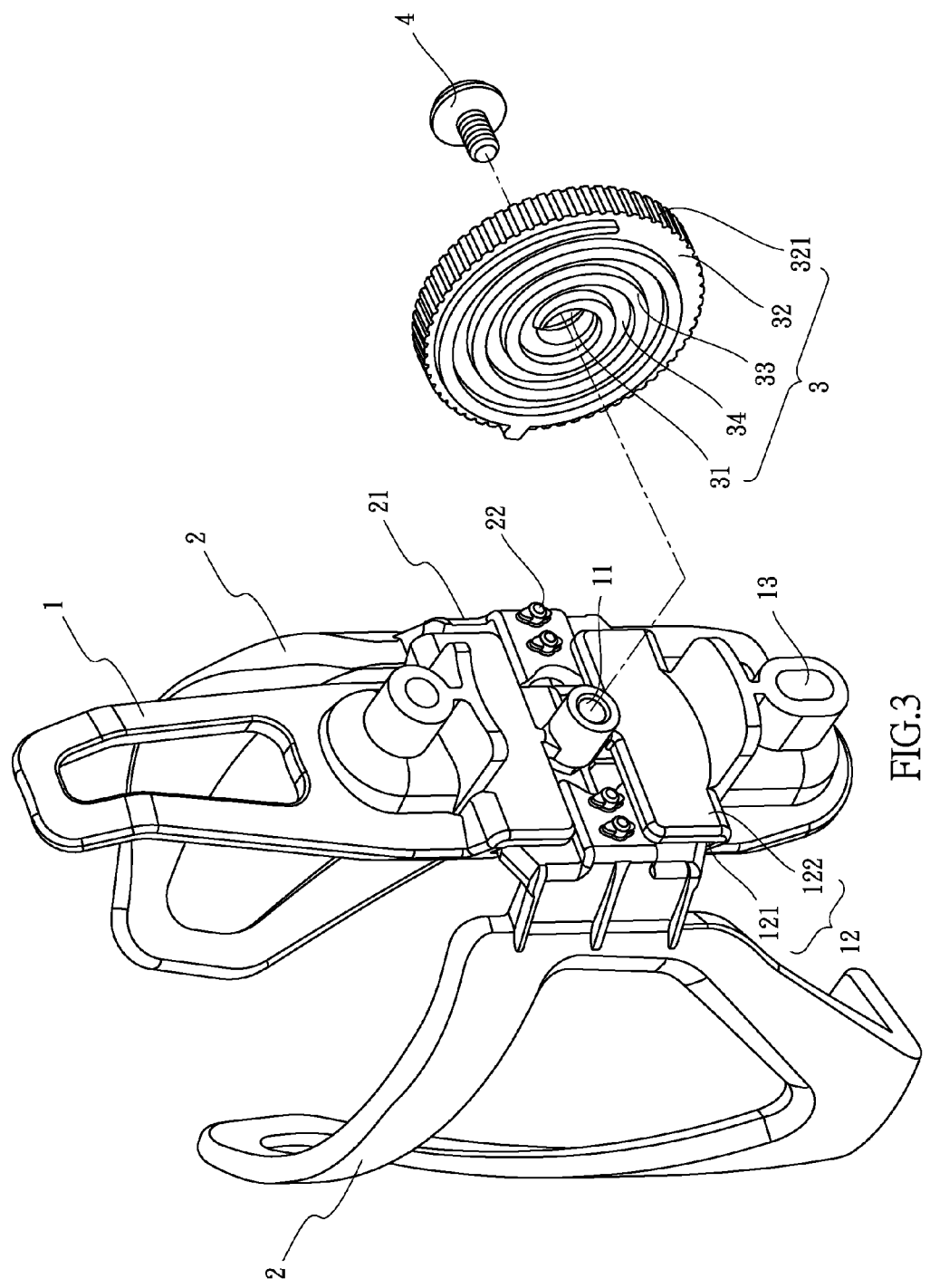
FIG. 3 is a perspective view of the assembly of the fixing base and the two side clipping members of the water bottle cage of the present invention.
Figure 4:
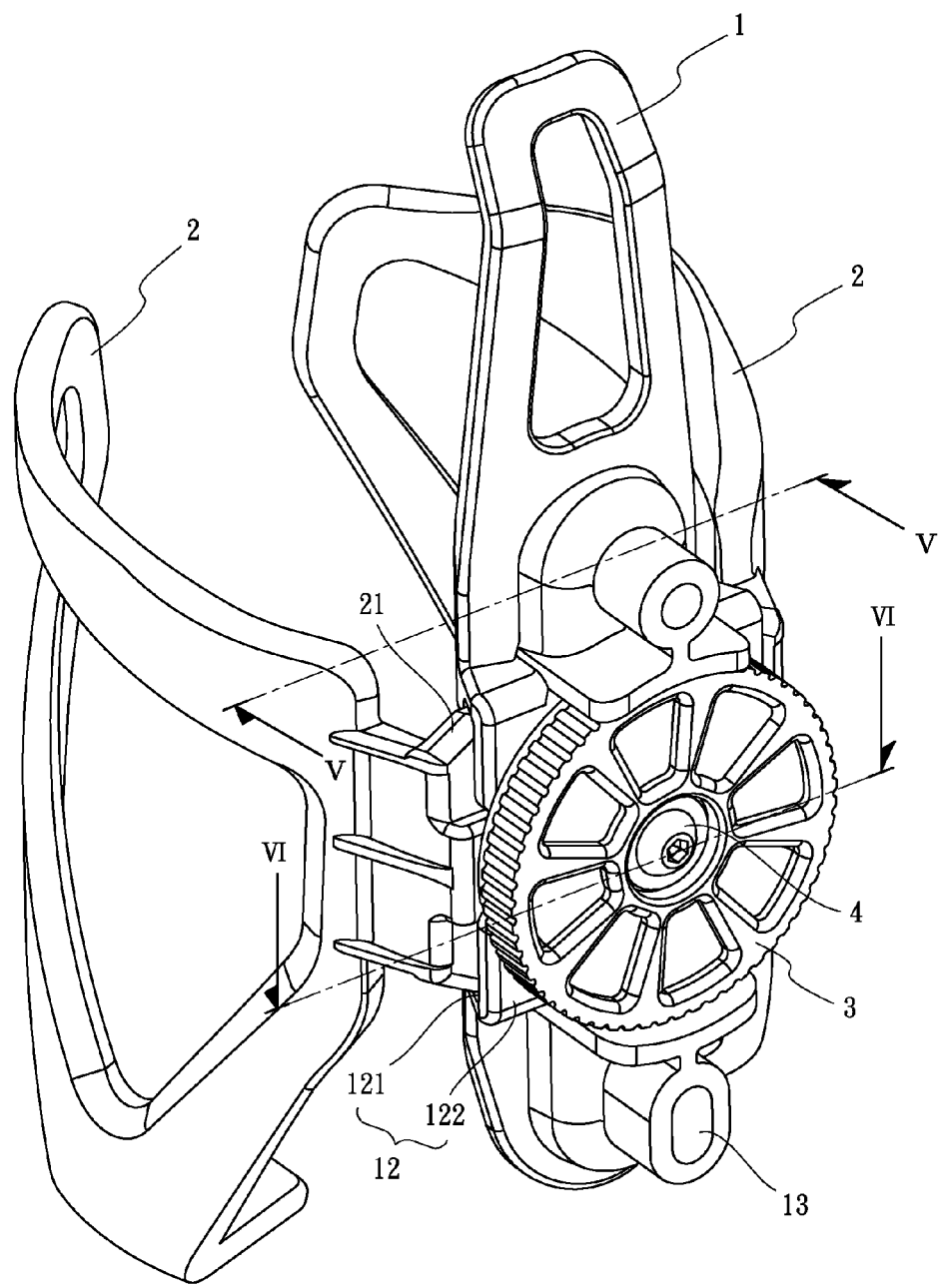
FIG. 4 is a perspective view of the water bottle cage for bi-directional clipping at two opposite sides of the present invention.

To describe clearly that the present invention achieves the foregoing objective and function, the technical features and desired function are described with reference to a preferred embodiment and accompanying drawings.

Please reference to FIGS. 1 to 4, a water bottle cage for bi-directional clipping at two opposite sides of present invention may comprise a fixing base 1, two side clipping members 2, and a driving member 3.

One side of the fixing base 1 has a supporting portion 11 and a guiding portion 12. The guiding portion 12 further includes a clipped guiding groove 121. The supporting portion 11 is located at a center of the clipped guiding groove 121 and protruded from the guiding portion 12.

One side of each of the two side clipping members 2 includes a clipped guiding plate 21. One side of the clipped guiding plate 21 corresponding to the guiding groove 121 has at least one guiding convex portion 22. An outer end of the at least one guiding convex portion 11 is protruded from the guiding portion 12. The two clipped guiding plates 21 are respectively located at two sides of the fixing base 1 and slidably arranged at two ends of the clipped guiding groove 121.

The driving member 3 has a limiting hole 31 and a spiral guiding groove 34. The limiting hole 31 of the driving member 3 is pivoted at the supporting portion 11 of the fixing base 1 and the spiral guiding groove 34 is assembled corresponding to the guiding convex portions 22 of the two clipped guiding plates 21.

Therefore, the spiral guiding groove 34 drives the guiding convex portions 22 of the two clipped guiding plates 21 due to the rotation of the driving member 3 so that the two side clipping members 2 are respectively moved along the clipped guiding groove 121 of the guiding portion 12 in opposite directions to achieve that a clipping distance of the two side clipping members 2 between two sides of the fixing base 1 is modulated to enlarge or shorten and a water bottle with various sizes and shapes is firmly clipped.

In FIGS. 1 to 4, the guiding portion 12 further includes two guiding plates 122. The two guiding plates 122 are respectively arranged at an upper side and a lower side of the supporting portion 11. One end of each guiding plate 122 is connected to the fixing base 1 and the other end of each guiding plate 122 is extended outwardly and bent relatively to space apart from each other. And the clipped guiding groove 121 is defined between the two guiding plates 122 and the fixing base 1. The driving member 3 further includes a holding portion 32 and a driving portion 33. The holding portion 32 is a disc shape and a plurality of convex teeth 321 is arranged at a peripheral of the holding portion 32. The driving portion 33 is arranged at a side surface of the holding portion 32 and the spiral guiding groove 34 is arranged at the driving portion 33. Furthermore, the fixing base 1 includes a limiting member 4 for passing through the limiting hole 31 of the driving member 3 to lock at the supporting portion 11 of the fixing base 1 and for limiting the driving member 3. In addition, the limiting member 4 has threads. A nut 111 is embedded in one end of the supporting portion 11 corresponding to the clipped guiding groove 121. A limiting step groove 311 is concavely arranged at one end of the limiting hole 31 of the driving member 3 which is opposite to the driving portion 33. The limiting member 4 is passing through the limiting hole 31 of the driving member 3 to screw with the nut 111. And a head end of the limiting member 4 is against in the limiting step groove 311. Two lower supporting plates 23 are further respectively arranged under the two side clipping members 2 and extended in opposite directions. The fixing base 1 further includes two fixing portions 13 for fixing at a bicycle. And the two fixing portions 13 are respectively arranged at an upper side and a lower side of the guiding portion 12.

Figure 5:
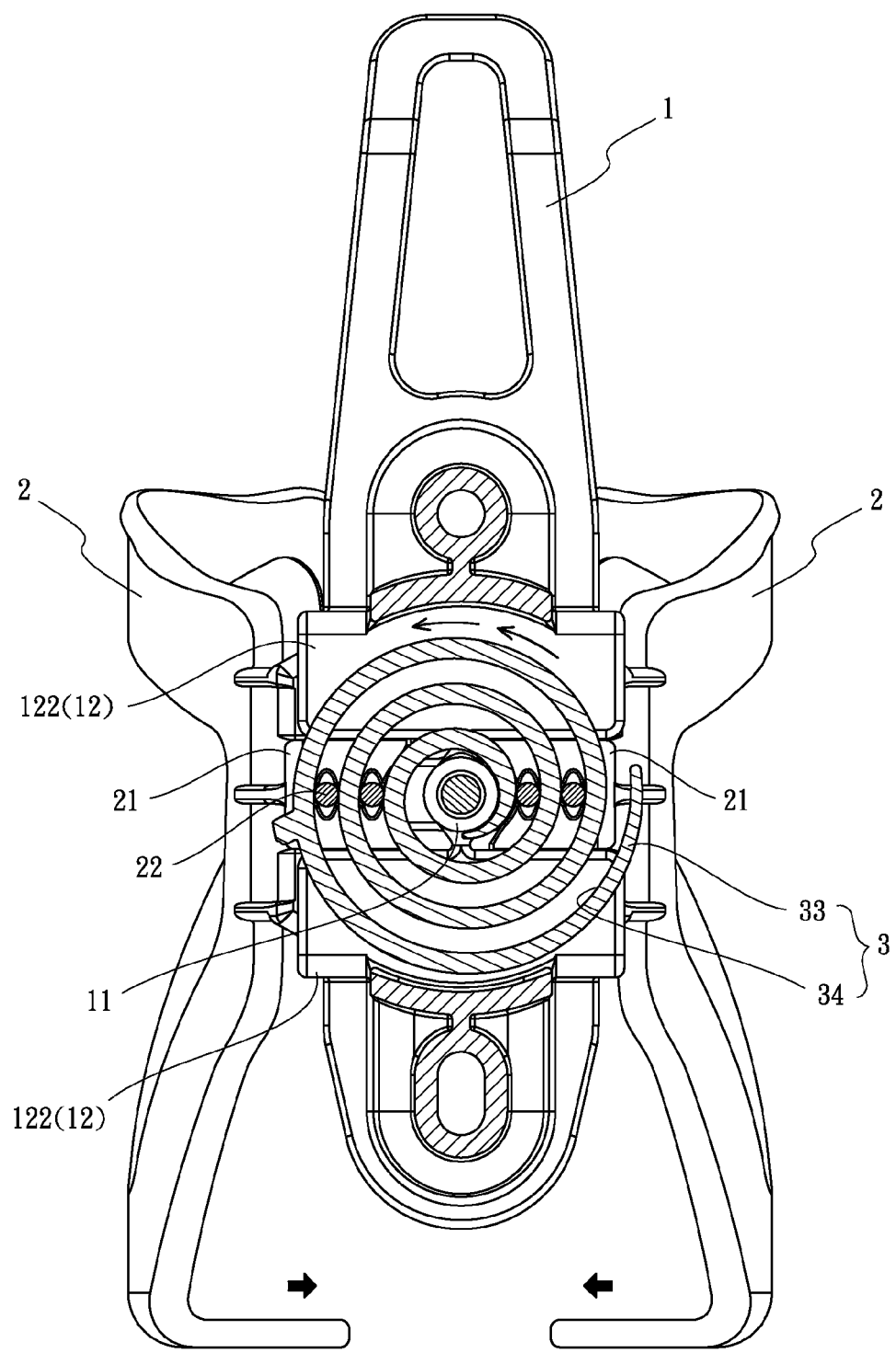
FIG. 5 is a cross-sectional view of FIG. 3 along line V-V.
Figure 6:
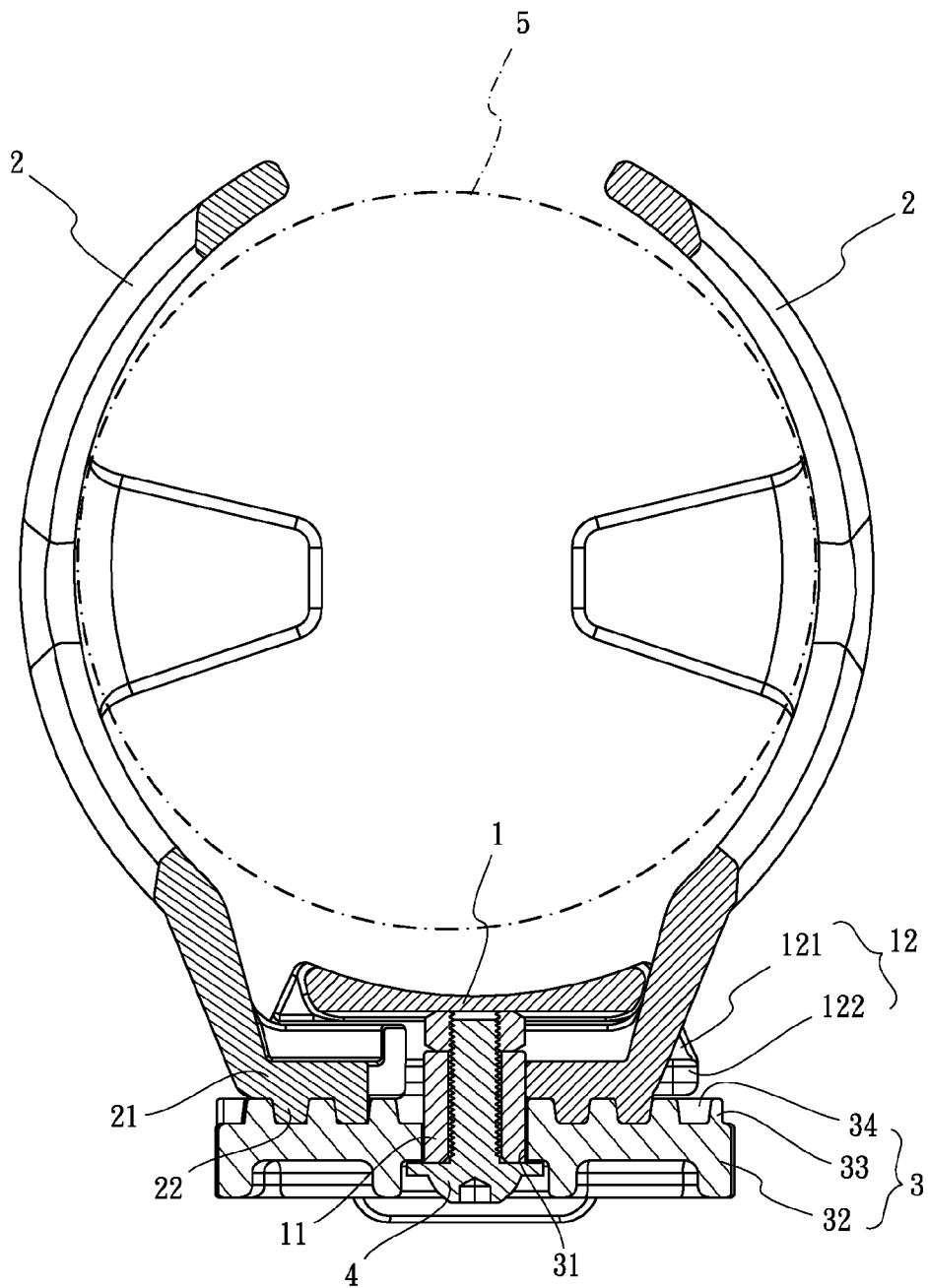
FIG. 6 is a cross-sectional view of FIG. 3 along line VI-VI.

Please refer to FIGS. 5 and 6, the clipped guiding plates 21 of the two side clipping members 2 are located at two sides of the fixing base 1 and respectively inserted and assembled to the two ends of the clipped guiding groove 121 of the guiding portion 12 so that the limiting hole 31 of the driving member 3 is covered at the supporting portion 11 of the fixing base 1, the limiting member 4 is passing through the limiting hole 31 of the driving member 3 to screw with the nut 111 which is embedded in the supporting portion 11 of the fixing base 1, and the driving member 3 is limited at the outer end of the supporting portion 11. Furthermore, it makes that the spiral guiding groove is assembled corresponding to the guiding convex portions 22 of the two clipped guiding plates 21. Due to the above mentioned arrangement of structure, the spiral guiding groove 34 drives the guiding convex portions 22 to move in the clipped guiding grooves 121 which are arranged at two sides of the supporting portion 11 to be operated in opposite directions. When the driving member 3 is rotated in counterclockwise direction which is the arc arrow shown as in FIG. 5, the spiral guiding groove 34 drives the guiding convex portions 22 with the helix of the spiral guiding groove 34 to make the two guiding plates 122 which are arranged at two sides of the supporting 11 move closer relatively. In FIG. 6, when the two side clipping members 2 are clipping two sides of the water bottle 5, the two side clipping members are further pushed to be against the fixing base 1 to ensure that the water bottle 5 is hard to drop off.

Figure 7:
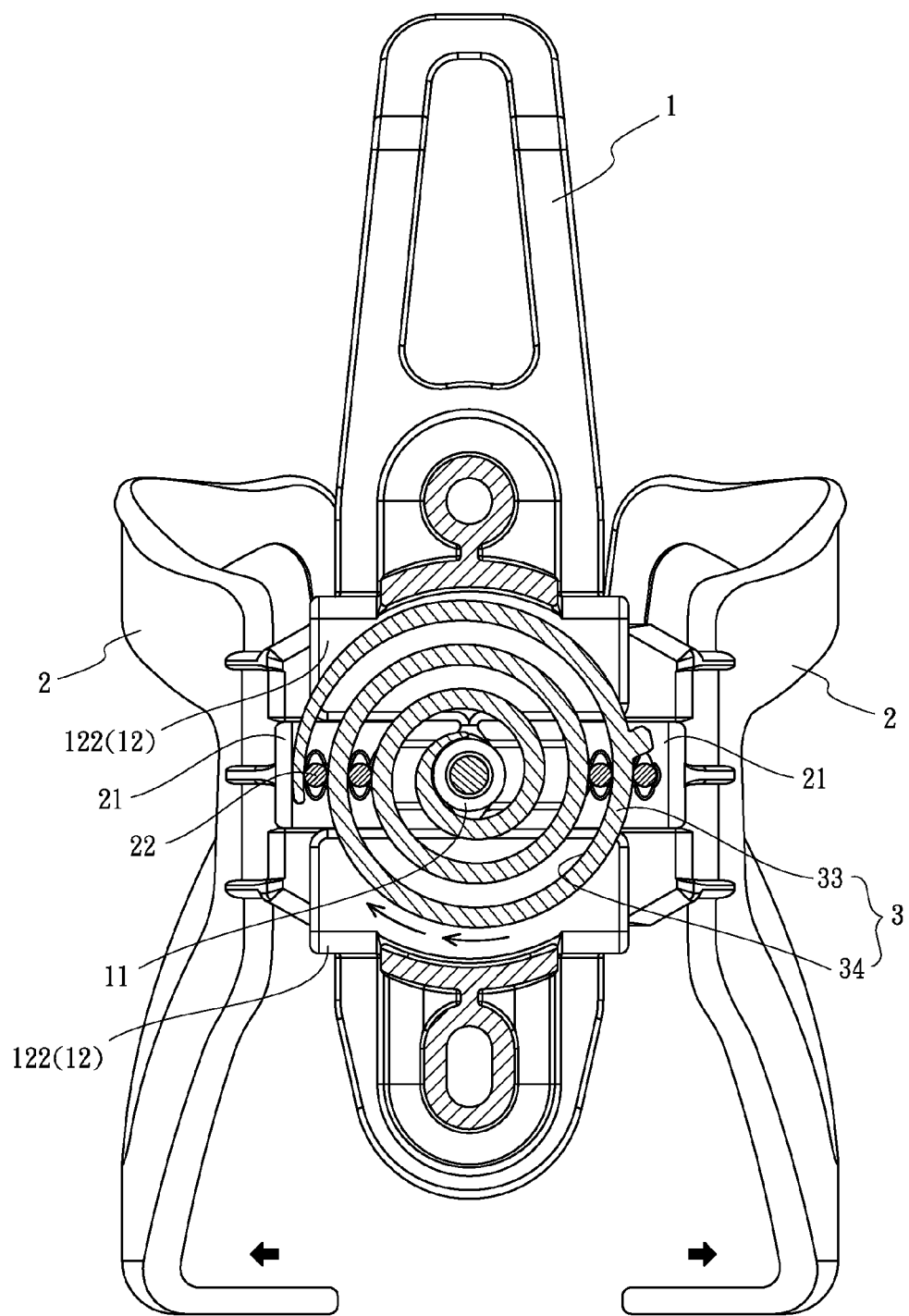
FIG. 7 is an operational view of FIG. 5 while the clipping distance of the two side clipping members between two sides of the fixing base is modulated to enlarge.
Figure 8:
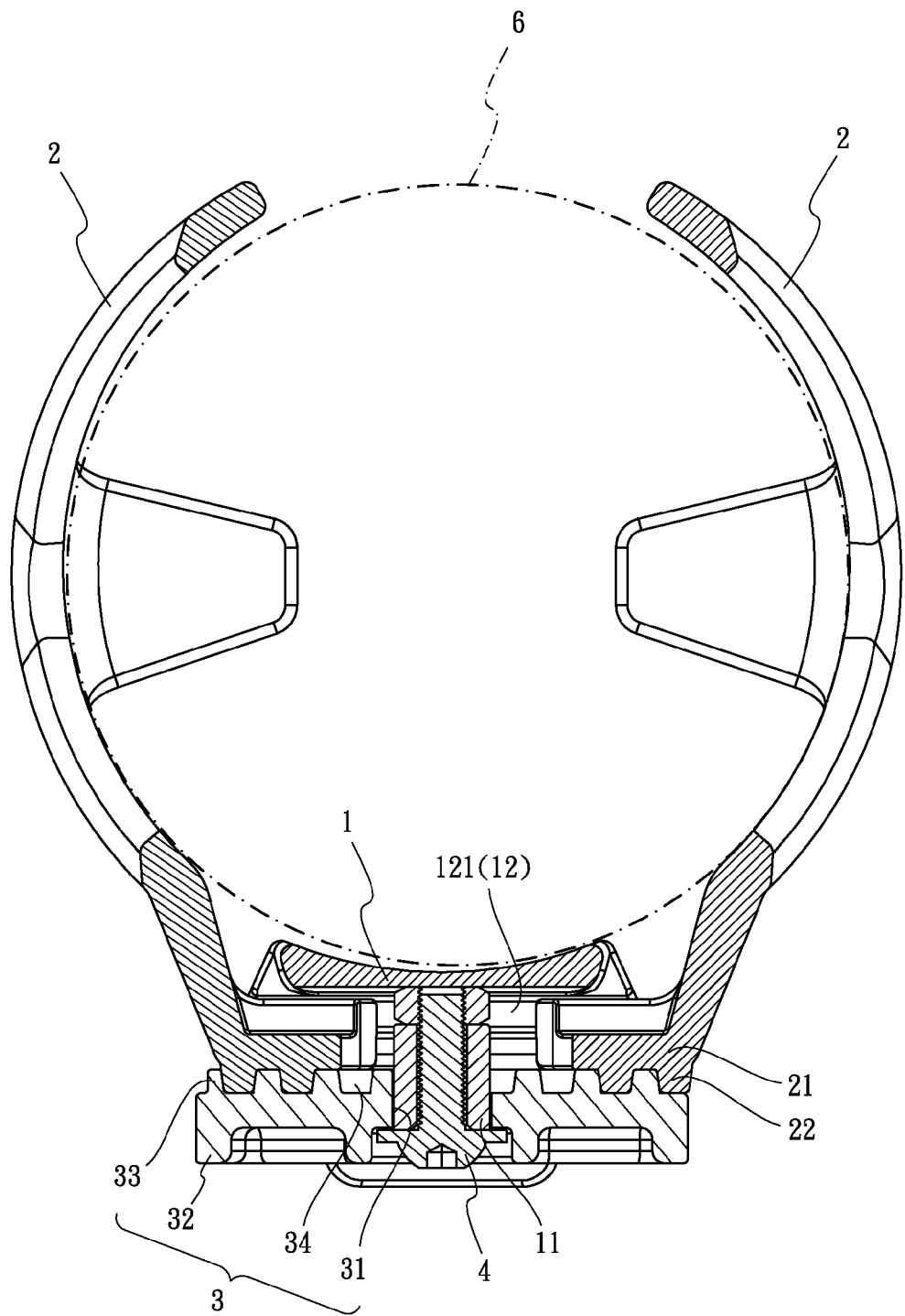
FIG. 8 is an operational view of FIG. 6 while the clipping distance of the two side clipping members between two sides of the fixing base is modulated to enlarge.

Please refer to FIGS. 7 and 8, the spiral guiding groove 34 drives the guiding convex portions 22 to move in the clipped guiding grooves 121 which are arranged at two sides of the supporting portion 11 to be operated in opposite directions. When the driving member 3 is rotated in clockwise direction which is the arc arrow shown as in FIG. 5, the spiral guiding groove 34 drives the guiding convex portions 22 with the helix of the spiral guiding groove 34 to make the two guiding plates 122 which are arranged at two sides of the supporting 11 move farther relatively. In FIG. 6, when the two side clipping members 2 are clipping two sides of the water bottle 5 with a larger clipping distance, the clipping distance of the two side clipping members are modulated to enlarge to clip a water bottle 6 with a bigger size for adapting to clip the water bottles with various sizes. Furthermore, the two side clipping members 2 are respectively clipping two sides of the water bottle 6 with bigger size and pushing the water bottle 6 to be against the fixing base 1 to form a three-point clip to firmly clip and ensure that the water bottle 6 is hard to drop off The foregoing descriptions are merely the exemplified embodiments of the present invention, where the scope of the claim of the present invention is not intended to be limited by the embodiments. Any equivalent embodiments or modifications without departing from the spirit and scope of the present invention are therefore intended to be embraced.

The disclosed structure of the invention has not appeared in the prior art and features efficacy better than the prior structure which is construed to be a novel and creative invention, thereby filing the present application herein subject to the patent law.

What is claimed is:

1. A water bottle cage for bi-directional clipping at two opposite sides, comprising:
    a fixing base, one side thereof has a supporting portion and a guiding portion, the guiding portion further includes a clipped guiding groove, the supporting portion is located at a center of the clipped guiding groove and protruded from the guiding portion;
    two side clipping members, one side of each of the two side clipping members includes a clipped guiding plate, one side of the clipped guiding plate corresponding to the guiding groove has at least one guiding convex portion, an outer end of the at least one guiding convex portion is protruded from the guiding portion, the clipped guiding plates are respectively located at two sides of the fixing base and slidably arranged at two ends of the clipped guiding groove; and
    a driving member, having a limiting hole and a spiral guiding groove, the limiting hole is pivoted at the supporting portion of the fixing base, and the spiral guiding groove is assembled corresponding to the guiding convex portions of the clipped guiding plates, the driving member includes a holding portion and a driving portion, the holding portion is a disc shape and a plurality of convex teeth is arranged at a peripheral of the holding portion, the driving portion is arranged at a side surface of the holding portion and the spiral guiding groove is arranged at the driving portion, the fixing base includes a limiting member for passing through the limiting hole of the driving member to lock at the supporting portion and for limiting the driving member;
    wherein the spiral guiding groove drives the guiding convex portions of the clipped guiding plates due to the rotation of the driving member so that the two side clipping members are respectively moved along the clipped guiding groove of the guiding portion in opposite directions to achieve that a clipping distance of the two side clipping members is modulated and a water bottle with various sizes and shapes is firmly clipped.

2. The water bottle cage as claimed in claim 1, wherein the limiting member has threads, a nut is embedded in one end of the supporting portion corresponding to the clipped guiding groove, a limiting step groove is concavely arranged at one end of the limiting hole of the driving member opposite to the driving portion, the limiting member is passing through the limiting hole of the driving member to screw with the nut, and a head end of the limiting member is against the limiting step groove.

3. The water bottle cage as claimed in claim 1, wherein the fixing base includes two fixing portions for fixing at a bicycle, and the two fixing portions are respectively arranged at an upper side and a lower side of the guiding portion.

4. The water bottle cage as claimed in claim 1, wherein two lower supporting plates are respectively arranged under the two side clipping members and extended in opposite directions.

5. The water bottle cage as claimed in claim 4, wherein the fixing base includes two fixing portions for fixing at a bicycle, and the two fixing portions are respectively arranged at an upper side and a lower side of the guiding portion.

\* \* \* \* \*